(12) United States Patent
Kim et al.

(10) Patent No.: US 12,468,357 B2
(45) Date of Patent: Nov. 11, 2025

(54) ELECTRONIC DEVICE COMPRISING HOUSING

(71) Applicant: Samsung Electronics Co., Ltd., Suwon-si (KR)

(72) Inventors: Seonghyeon Kim, Suwon-si (KR); Taeyoung Bae, Suwon-si (KR); Hyowon Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

(21) Appl. No.: 18/327,440

(22) Filed: Jun. 1, 2023

(65) Prior Publication Data
US 2023/0315167 A1 Oct. 5, 2023

Related U.S. Application Data

(63) Continuation of application No. PCT/KR2021/015590, filed on Nov. 1, 2021.

(30) Foreign Application Priority Data

Dec. 2, 2020 (KR) .................... 10-2020-0166720

(51) Int. Cl.
*G06F 1/16* (2006.01)
*H01Q 1/40* (2006.01)
(Continued)

(52) U.S. Cl.
CPC .......... *G06F 1/1698* (2013.01); *G06F 1/1635* (2013.01); *H01Q 1/40* (2013.01); *H05K 5/0086* (2013.01); *H05K 5/04* (2013.01)

(58) Field of Classification Search
CPC .... G06F 1/1626; G06F 1/1633; G06F 1/1656; G06F 1/1684; G06F 1/1698; H04M 1/0249
See application file for complete search history.

(56) References Cited

U.S. PATENT DOCUMENTS 6,173,898 B1 * 1/2001 Mande ............. G06K 19/07722
257/679
8,561,831 B2 * 10/2013 Liao ...................... G06F 1/1656
312/223.4
(Continued)

FOREIGN PATENT DOCUMENTS

CN 206040759 U 3/2017
CN 108174541 A 6/2018
(Continued)

OTHER PUBLICATIONS

Korean Office Action dated Jan. 17, 2025, issued in Korean Application No. 10-2020-0166720.
(Continued)

*Primary Examiner* — Adrian S Wilson
(74) *Attorney, Agent, or Firm* — Jefferson IP Law, LLP

(57) ABSTRACT

An electronic device is provided. The electronic device includes a housing comprising a metal area and a resin area, a display disposed on the housing, and a battery disposed inside the housing. The metal area includes a first metal area supporting the battery, and at least one second metal area forming at least one part of a side surface of the electronic device, the at least one second metal area comprising a protruding structure protruding toward the first metal area. The resin area is disposed between the first metal area and second metal area. The protruding structure can include a first surface facing the resin area and a second surface toward the inside of the electronic device.

12 Claims, 13 Drawing Sheets

(51) Int. Cl.
*H05K 5/00* (2006.01)
*H05K 5/04* (2006.01)

(56) References Cited

U.S. PATENT DOCUMENTS

| | | | |
|---|---|---|---|
| 9,699,926 B2* | 7/2017 | Hwang | B05D 5/067 |
| 10,321,590 B2* | 6/2019 | Cater | H01Q 1/24 |
| 10,353,440 B2 | 7/2019 | Ou et al. | |
| 10,705,570 B2* | 7/2020 | Kuna | H01Q 21/28 |
| 11,133,572 B2* | 9/2021 | Zhang | H01Q 1/44 |
| 11,175,769 B2* | 11/2021 | Prest | G06F 1/1694 |
| 11,178,785 B2* | 11/2021 | Shi | H05K 5/03 |
| 11,189,909 B2* | 11/2021 | Leutheuser | H01Q 1/12 |
| 11,258,163 B2* | 2/2022 | Froese | H04M 1/0283 |
| 11,366,523 B2* | 6/2022 | Ligtenberg | G06F 1/165 |
| 11,379,010 B2* | 7/2022 | Kuna | G06F 1/1698 |
| 2002/0133942 A1* | 9/2002 | Kenison | G06K 19/07745 |
| | | | 29/841 |
| 2005/0130721 A1* | 6/2005 | Gartrell | H04M 1/0283 |
| | | | 455/575.8 |
| 2008/0049949 A1* | 2/2008 | Snider | H05K 13/00 |
| | | | 381/86 |
| 2011/0020613 A1* | 1/2011 | Kim | B05D 5/068 |
| | | | 427/256 |
| 2011/0188178 A1* | 8/2011 | Myers | H01Q 1/42 |
| | | | 361/679.01 |
| 2012/0175165 A1* | 7/2012 | Merz | G06F 1/1656 |
| | | | 174/50 |
| 2013/0050911 A1 | 2/2013 | Jarvis | |
| 2014/0002312 A1* | 1/2014 | Konanur | H01Q 13/10 |
| | | | 343/702 |
| 2016/0072932 A1* | 3/2016 | Hill | H04M 1/0249 |
| | | | 455/575.1 |
| 2016/0207236 A1 | 7/2016 | Tsubota et al. | |
| 2017/0111077 A1 | 4/2017 | Hwang et al. | |
| 2018/0070465 A1 | 3/2018 | Cater et al. | |
| 2019/0317553 A1 | 10/2019 | Cho et al. | |
| 2020/0266522 A1 | 8/2020 | Moon et al. | |
| 2021/0004058 A1 | 1/2021 | Lim et al. | |
| 2021/0037126 A1 | 2/2021 | Yoo et al. | |

FOREIGN PATENT DOCUMENTS

| | | |
|---|---|---|
| EP | 2 922 282 B1 | 3/2019 |
| KR | 10-2015-0123956 A | 11/2015 |
| KR | 10-1571289 B1 | 11/2015 |
| KR | 10-1720217 B1 | 3/2017 |
| KR | 10-2017-0044527 A | 4/2017 |
| KR | 10-1775004 B1 | 9/2017 |
| KR | 10-2017-0110307 A | 10/2017 |
| KR | 10-2018-0048159 A | 5/2018 |
| KR | 10-2018-0113220 A | 10/2018 |
| KR | 10-2019-0097553 A | 8/2019 |
| KR | 10-2019-0098607 A | 8/2019 |
| KR | 10-1981537 B1 | 8/2019 |
| KR | 10-2019-0119924 A | 10/2019 |
| KR | 10-2020-0101172 A | 8/2020 |

OTHER PUBLICATIONS

International Search Report dated Jan. 28, 2022, issued in International Application No. PCT/KR2021/015590.
European Search Report dated Apr. 9, 2024, issued in European Application No. 21900828.1.

* cited by examiner

ELECTRONIC DEVICE COMPRISING HOUSING

CROSS-REFERENCE TO RELATED APPLICATION(S)

This application is a continuation application, claiming priority under § 365(c), of an International application No. PCT/KR2021/015590, filed on Nov. 1, 2021, which is based on and claims the benefit of a Korean patent application number 10-2020-0166720, filed on Dec. 2, 2020, in the Korean Intellectual Property Office, the disclosure of which is incorporated by reference herein in its entirety.

BACKGROUND

1. Field

The disclosure relates to an electronic device including a housing.

2. Description of Related Art

Owing to the development of information and communication technology and semiconductor technology, various functions are integrated in a single portable electronic device. For example, an electronic device may implement not only a communication function but also an entertainment function such as games, a multimedia function such as music/video playback, a communication and security function such as mobile banking, schedule management, and an electronic wallet function. Such electronic devices are miniaturized so that users may conveniently carry them.

Studies have recently been made on an antenna structure which may maintain the durability of a miniaturized electronic device, while efficiently conducting communication with an external electronic device in the electronic device.

The above information is presented as background information only to assist with an understanding of the disclosure. No determination has been made, and no assertion is made, as to whether any of the above might be applicable as prior art with regard to the disclosure.

SUMMARY

An electronic device (e.g., a portable terminal or a tablet) may use part of a housing as an antenna. For example, a metal area of the housing divided by a resin area may be used as an antenna.

Along with an increase in the size of an electronic device, the length and/or number of metal areas used as an antenna in a housing may increase, which may make it difficult to secure mechanical stability. For example, the electronic device may be bent due to a load applied to the metal areas during a manufacturing process (e.g., a cutting process and a post process) of the electronic device.

Aspects of the disclosure are to address at least the above-mentioned problems and/or disadvantages and to provide at least the advantages described below. Accordingly, an aspect of the disclosure is to provide an electronic device for a protrusion structure formed by being cut from a bridge structure connecting metal areas to be used as an antenna in order to reduce bending of the electronic device caused by a load applied during a manufacturing process of the electronic device.

Another aspect of the disclosure is to provide a method of manufacturing an electronic device for a process of separating metal areas to be used as an antenna by cutting a bridge structure and an injection area together in order to use the metal areas as the antenna.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a metal area and a resin area, a display disposed on the housing, and a battery disposed within the housing, wherein the metal area includes a first metal area supporting the battery, and at least one second metal area forming at least part of a side surface of the electronic device and including a protrusion structure protruding toward the first metal area, wherein the resin area is disposed between the first metal area and the second metal area, and wherein the protrusion structure includes a first surface facing the resin area and a second surface facing an inside of the electronic device.

In accordance with another aspect of the disclosure, a method of manufacturing an electronic device is provided. The method includes a first cutting process of forming a first metal area, a plurality of second metal areas forming at least part of an edge of a housing, a first bridge structure connected to the plurality of second metal areas, and a second bridge structure connected to the first metal area and at least two of the plurality of second metal areas by cutting a metal area of the housing, an injection process of forming a resin area by disposing a resin material to be located between the first metal area and the plurality of second metal areas and surrounding the first bridge structure, and a second cutting process of forming a protrusion structure including a first surface facing the resin area and a second surface exposed into the electronic device by cutting the first bridge structure and the resin area.

According to various embodiments of the disclosure, as an electronic device uses a bridge structure that connects metal areas to each other to be used as an antenna until a cutting process after an injection process, bending of the electronic device, which may occur during a manufacturing process of the electronic device, may be reduced.

According to various embodiments of the disclosure, a method of manufacturing an electronic device may include a process of cutting both a bridge structure connecting metal areas to be used as an antenna and an injection area used as a segmenter of an antenna in a cutting process after an injection process. Bending caused by the bridge structure during a manufacturing process of the electronic device may be reduced, and an antenna function may be secured by cutting the bridge structure and thus spacing the metal areas used as an antenna apart from each other.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
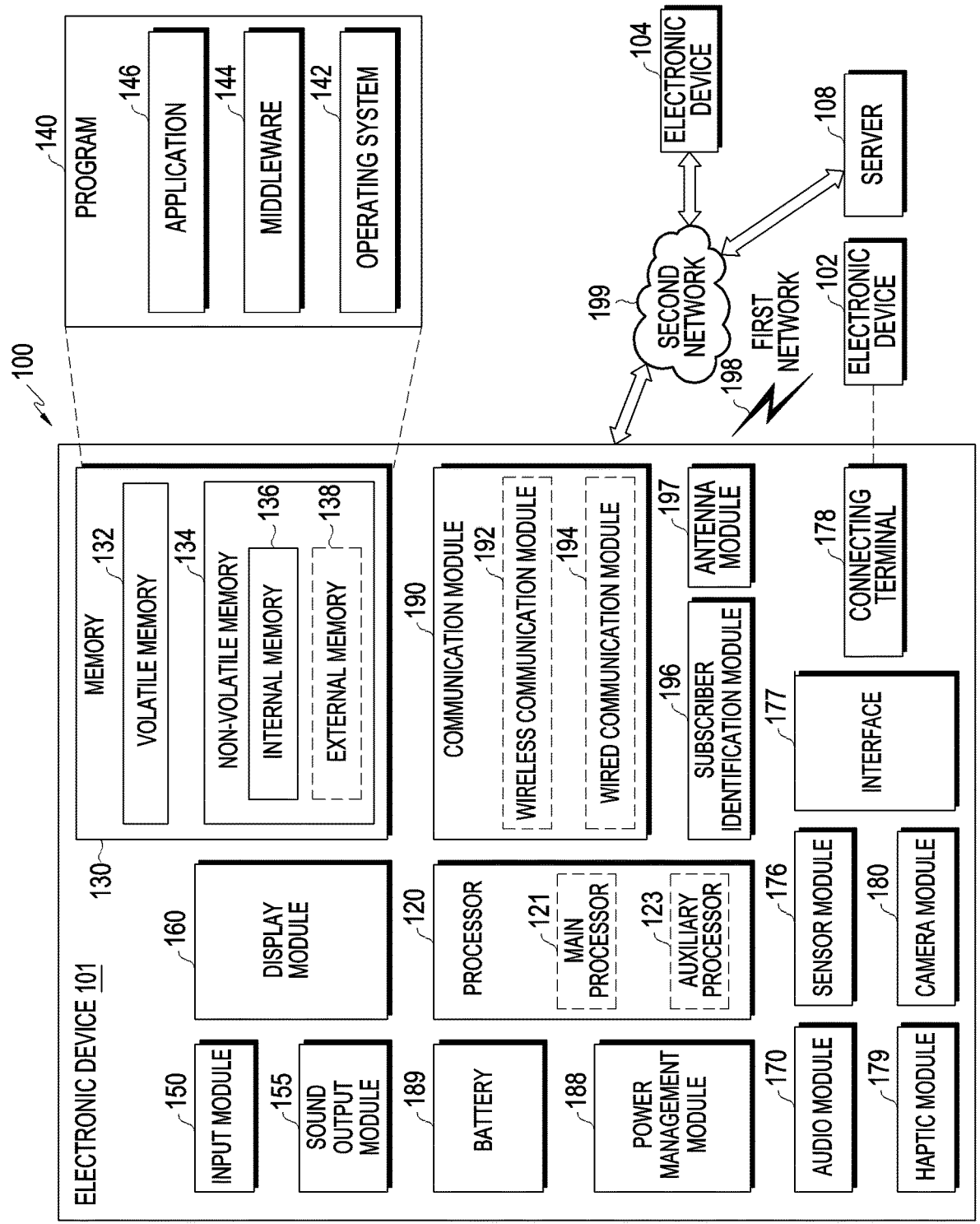
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
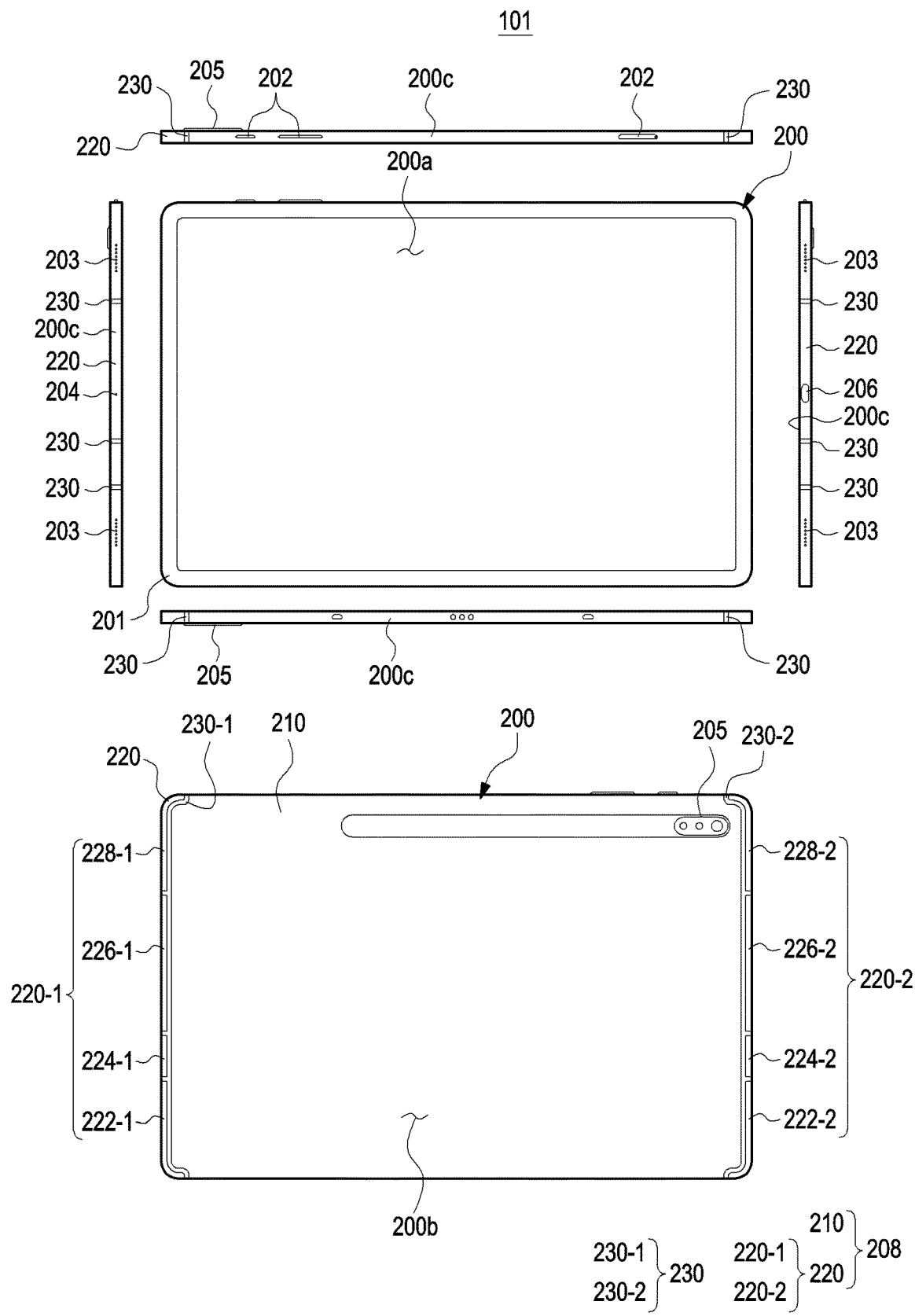
FIG. 2 is a plan view illustrating an electronic device according to an embodiment of the disclosure.

FIG. 2 is a plan view illustrating an electronic device according to an embodiment of the disclosure.

Figure 3A:
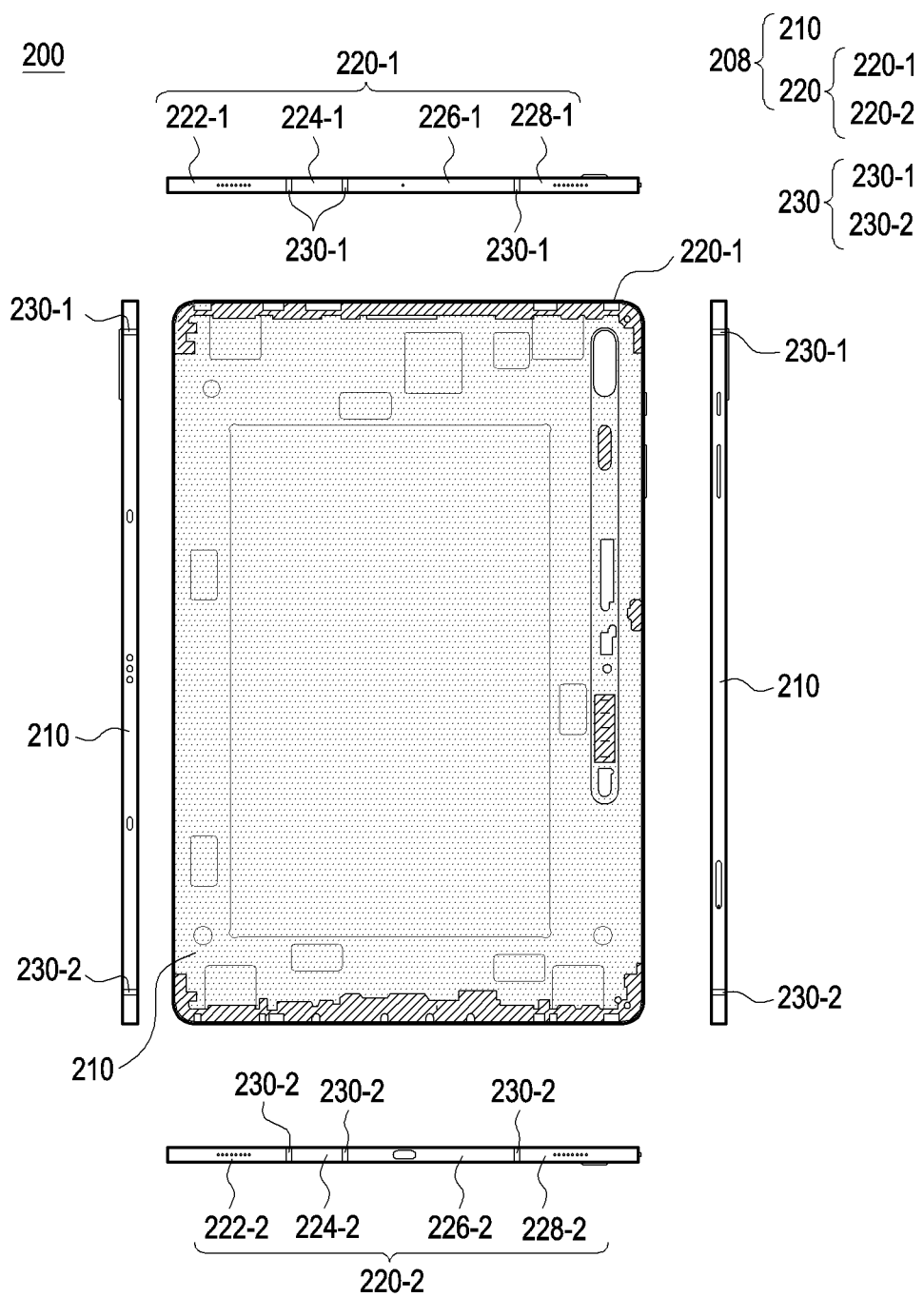
FIGS. 3A and 3B are plan views illustrating a housing according to various embodiments of the disclosure.
Figure 3B:
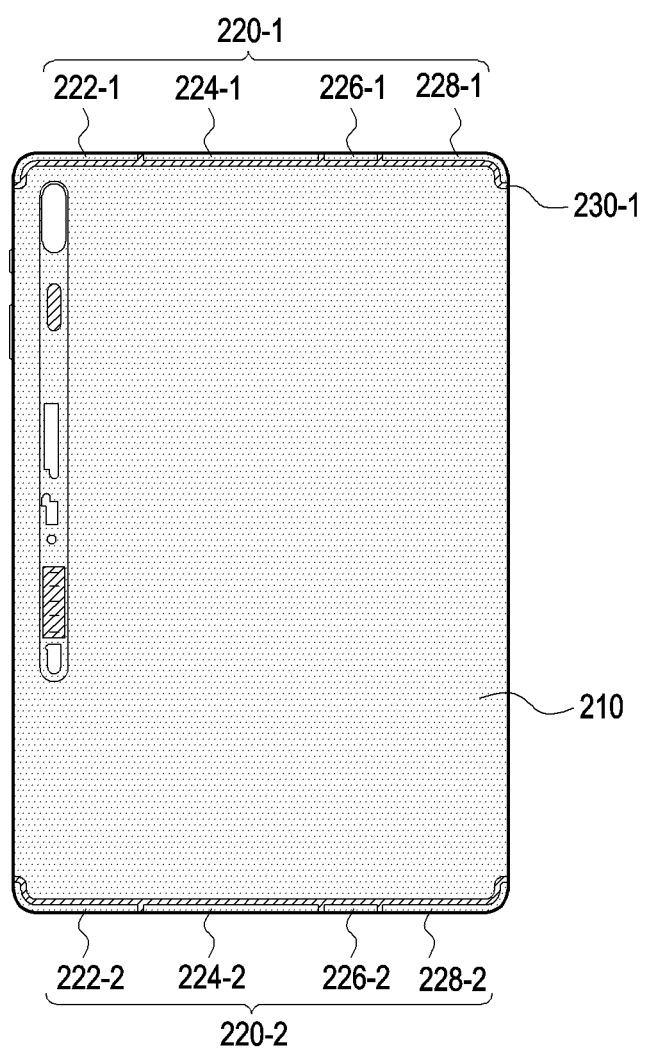

FIGS. 3A and 3B are plan views illustrating a housing according to various embodiments of the disclosure.

Figure 4:
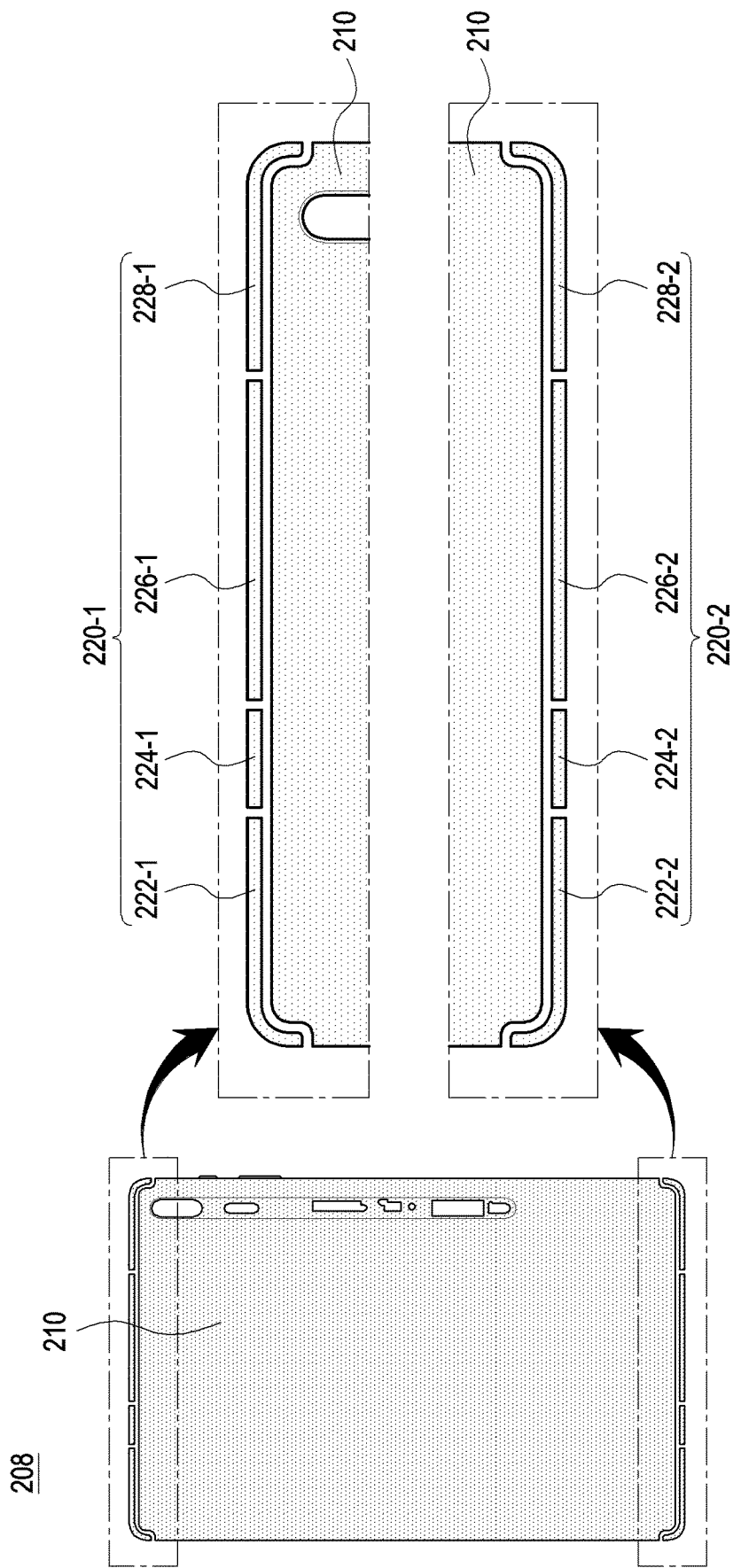
FIG. 4 is a front view illustrating a metal area in a housing according to an embodiment of the disclosure.

FIG. 4 is a front view illustrating a metal area in a housing according to an embodiment of the disclosure.

Referring to FIGS. 2, 3A, 3B, and 4, the electronic device 101 may be a portable electronic device (e.g., a tablet). The electronic device 101 may include a housing 200 including a metal area 208 and a resin area 230.

The housing 200 may include a front surface 200$a$, a rear surface 200$b$, and a side surface 200$c$ surrounding a space between the front surface 200$a$ and the rear surface 200$b$. The front surface 200$a$ may be a front plate which is at least partially transparent. For example, the front surface 200$a$ of the housing 200 may include a glass plate or polymer plate including various coating layers. The rear surface 200$b$ and/or the side surface 200$c$ may be formed of metal. The front surface 200$a$, the rear surface 200$b$, and/or the side surface 200$c$ of the housing 200 may be interpreted as the front surface 200$a$, the rear surface 200$b$, and/or the side surface 200$c$ of the electronic device 101.

The metal area 208 may include a first metal area 210 and a second metal area 220. The metal area 208 may include at least one of aluminum, stainless steel, or magnesium. The second metal area 220 may be spaced apart from the first metal area 210.

The first metal area 210 may support components (e.g., a battery (the battery 189 of FIG. 1) and the display module 160) of the electronic device 101. The first metal area 210 may form at least part of an edge of the electronic device 101. For example, the first metal area 210 may form at least parts of the rear surface 200$b$ and the side surface 200$c$.

The second metal area 220 may function as an antenna. For example, the second metal area 220 may be electrically connected to an antenna module (e.g., the antenna module 197 of FIG. 1) to transmit or receive electromagnetic waves.

The second metal area 220 may form at least part of an edge of the electronic device 101. For example, the second metal area 220 may form at least part of the side surface 200$c$ of the housing 200.

The electronic device 101 may include a plurality of second metal areas 220. The second metal area 220 may be located at the front and rear of the housing 200. For example, the second metal area 220 may include a front second metal area 220-1 located at the front of the housing 200 and a rear second metal area 220-2 spaced apart from the front second metal area 220-1.

The second metal area 220 may include a plurality of second metal areas separated by the resin area 230. For example, the front second metal area 220-1 and the rear second metal area 220-2 of the second metal area 220 may be divided into a plurality of antennas to perform an antenna function. The front second metal area 220-1 may include at least one of a $(2-1)^{th}$ metal area 222-1, a $(2-2)^{th}$ metal area 224-1, a $(2-3)^{th}$ metal area 226-1, or a $(2-4)^{th}$ metal area 228-1, and the rear second metal area 220-2 may include at least one of a $(2-5)^{th}$ metal area 222-2, a $(2-6)^{th}$ metal area 224-2, a $(2-7)^{th}$ area 226-2, or a $(2-8)^{th}$ metal area 228-2.

The resin area 230 may connect the first metal area 210 and the second metal area 220 to each other. At least part of the resin area 230 may be disposed between the first metal area 210 and the second metal area 220. The resin area 230 may form at least part of the rear surface 200$b$ and/or at least part of the side surface 200$c$ of the housing 200.

The plurality of second metal areas may be electrically separated from each other by the resin area 230. For example, the resin area 230 may be a segmenter that divides the second metal area 220. The resin area 230 may be made of an insulating material. The electrical conductivity of the resin area 230 may be less than that of the metal area 208. The front second metal area 222-1, 224-1, 226-1, and 228-1 or the rear second metal area 222-2, 224-2, 226-2, and 228-2 may be disposed on the resin area 230.

According to an embodiment of the disclosure, the electronic device 101 may include a plurality of resin areas 230. The resin area 230 may be located at the front and rear of the housing 200. For example, the resin area 230 may include a front resin area 230-1 disposed between the front second metal area 220-1 and the first metal area 210, and a rear resin area 230-2 disposed between the rear second metal area 220-2 and the first metal area 210.

The electronic device 101 may include a display 201, key input structures 202, audio modules 203 and 204, a light emitting element (not shown), a camera module 205, a connector hole 206, and/or a sensor module (not shown). In some embodiments, the electronic device 101 may omit at least one (e.g., the connector hole 206) of the components or additionally include another component.

The display 201 (e.g., the display module 160 of FIG. 1) may be coupled with or disposed adjacent to a touch sensing circuit, a pressure sensor capable of measuring the intensity (pressure) of a touch, and/or a digitizer that detects a magnetic field type stylus pen. According to an embodiment, the display 201 may be visually exposed through the front surface 200$a$ of the housing 200.

According to an embodiment of the disclosure, the key input structures 202 (e.g., the input module 150 or the sensor module 176 of FIG. 1) may be disposed on the side surface 200$c$ of the housing 200. In another embodiment, the electronic device 101 may omit one or more of the above-described key input structures 202, and the key input structures 202 that are not included may be implemented in a different form such as soft keys on the display 201.

The light emitting element (not shown) may be disposed on, for example, the front surface 200a and/or the rear surface 200b of the housing 200. The light emitting element (not shown) may provide, for example, state information of the electronic device 101 in the form of light. In another embodiment, the light emitting element (not shown) may provide a light source interlocking with the operation of a front camera module (not shown) or the rear camera module 205. The light emitting element (not shown) may include, for example, a light emitting diode (LED), an IR LED, and/or a xenon lamp.

The camera module 205 (e.g., the camera module 180 of FIG. 1) may include one or more lenses, an image sensor, an image signal processor, and/or a flash. The flash may include, for example, an LED or a xenon lamp. Two or more lenses (an IR camera, a wide-angle lens, and a telephoto lens) and image sensors may be disposed on one surface of the electronic device 101. The electronic device 101 may include the front camera module (not shown) disposed on the front surface 200a of the electronic device 101 and the rear camera module 205 disposed on the rear surface 200b of the electronic device 101.

The connector hole 206 (e.g., the connecting terminal 178 of FIG. 1) may accommodate, for example, a connector (e.g., a USB connector) for transmitting and receiving power and/or data to and from an external electronic device or a connector (e.g., an earphone jack) for transmitting and receiving audio signals to and from an external electronic device.

The sensor module (e.g., the sensor module 176 of FIG. 1) may generate an electrical signal or data value corresponding to, for example, an internal operating state of the electronic device 101 or an external environmental state. The sensor module (not shown) may include, for example, a first sensor module (not shown) (e.g., a proximity sensor) and/or a second sensor module (not shown) (e.g., a fingerprint sensor) disposed on the front surface 200a of the housing 200, and/or a third sensor module (not shown) (e.g., an HRM sensor) and/or a fourth sensor module (not shown) (e.g., a fingerprint sensor) disposed on the rear surface 200b of the housing 200. According to an embodiment of the disclosure (not shown), the fingerprint sensors may be disposed on the rear surface 200b as well as the front surface 200a (e.g., the display 201) of the housing 200. The electronic device 101 may further include a sensor module (not shown), for example, at least one of a gesture sensor, a gyro sensor, a barometric pressure sensor, a magnetic sensor, an acceleration sensor, a grip sensor, a color sensor, an IR sensor, a biometric sensor, a temperature sensor, a humidity sensor, and an illuminance sensor (not shown).

Figure 5:
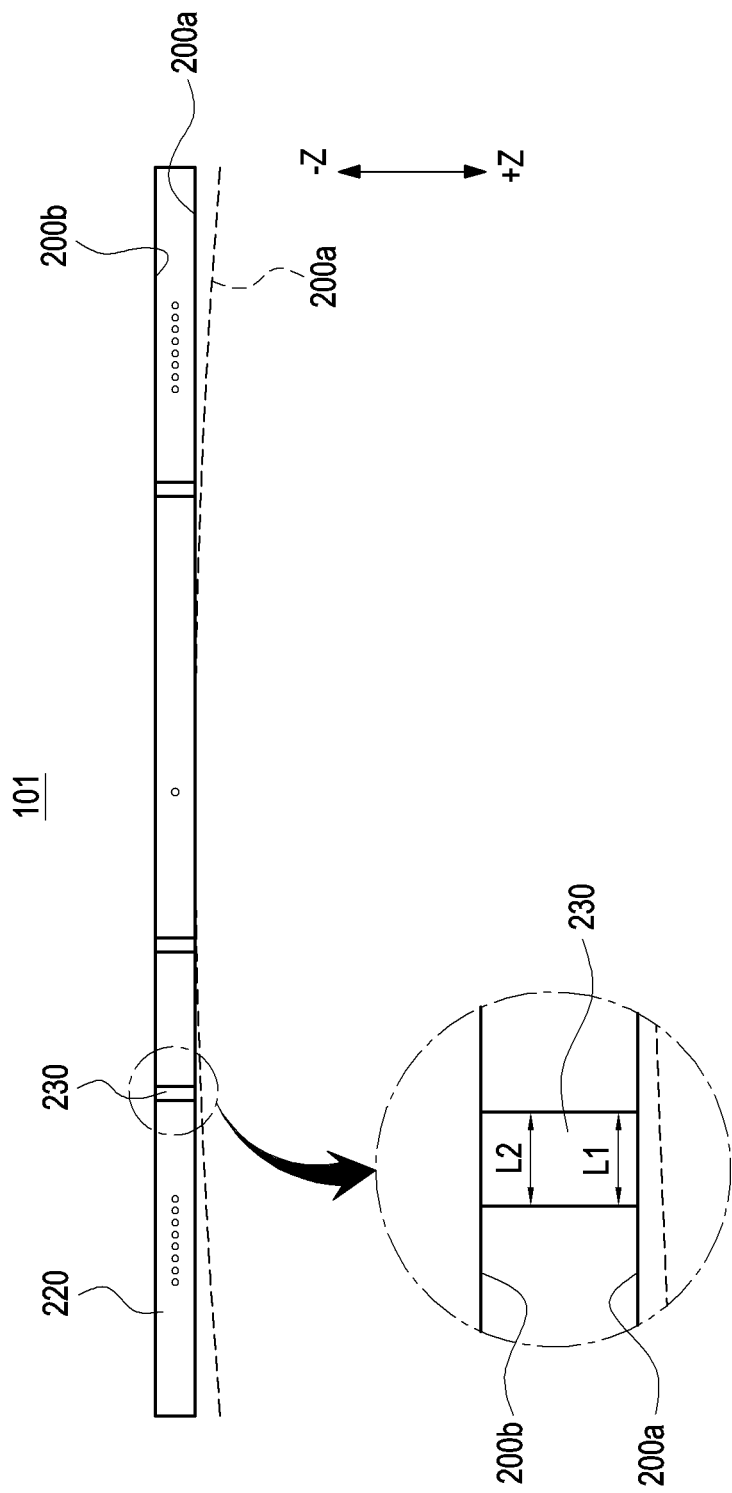
FIG. 5 is a diagram referred to for describing bending of an electronic device according to an embodiment of the disclosure.

FIG. 5 is a diagram referred to for describing bending of an electronic device according to an embodiment of the disclosure.

Referring to FIG. 5, the electronic device 101 may be bent in a thickness direction (e.g., a Z-axis direction). For example, because the number or length of second metal areas 220 increases for use as an antenna, the electronic device 101 may be vulnerable to external impact in the thickness direction (the Z-axis direction). The configurations of the electronic device 101, the second metal area 220, and the resin area 230 of FIG. 5 may be wholly or partially identical to those of the electronic device 101, the second metal area 220, and the resin area 230 of FIGS. 2, 3A, 3B, and 4.

The second metal area 220 of the electronic device 101 may include a plurality of second metal areas 222, 224, 226, and 228 (e.g., the (2-1)$^{th}$ metal area 222-1, the (2-2)$^{th}$ metal area 224-1, the (2-3)$^{th}$ metal area 226-1, and the (2-4)$^{th}$ metal area 228-1) spaced apart from each other, which are to be used as antennas. The resin area 230 may be disposed between the plurality of second metal areas 222, 224, 226, and 228, and the plurality of second metal areas 222, 224, 226, and 228 may be spaced apart from each other by the resin area 230.

The shape of the resin area 230 may be changed. The shape of the resin area 230 may be changed based on at least one of a process of cutting a metal area (e.g., the metal area 208 of FIG. 4) or the resin area 230, a post process (e.g., a buffing process or a sanding process using sandblasting), or shrinkage of the resin area 230 after injection. For example, a first length 11 of the front surface 200a of the electronic device 101, on which the display (e.g., the display 201 of FIG. 2) is located, may be less than a second length 12 of the rear surface 200b of the electronic device 101. The first length 11 of the housing without a protrusion structure (e.g., a protrusion structure 240 of FIG. 6) may be less than the second length 12. For example, the first length 11 of the housing without the protrusion structure (e.g., the protrusion structure 240 of FIG. 6) may be less than the second length 12 by 0.05 mm to 0.07 mm. The protrusion structure 240 will be described below.

Figure 6:
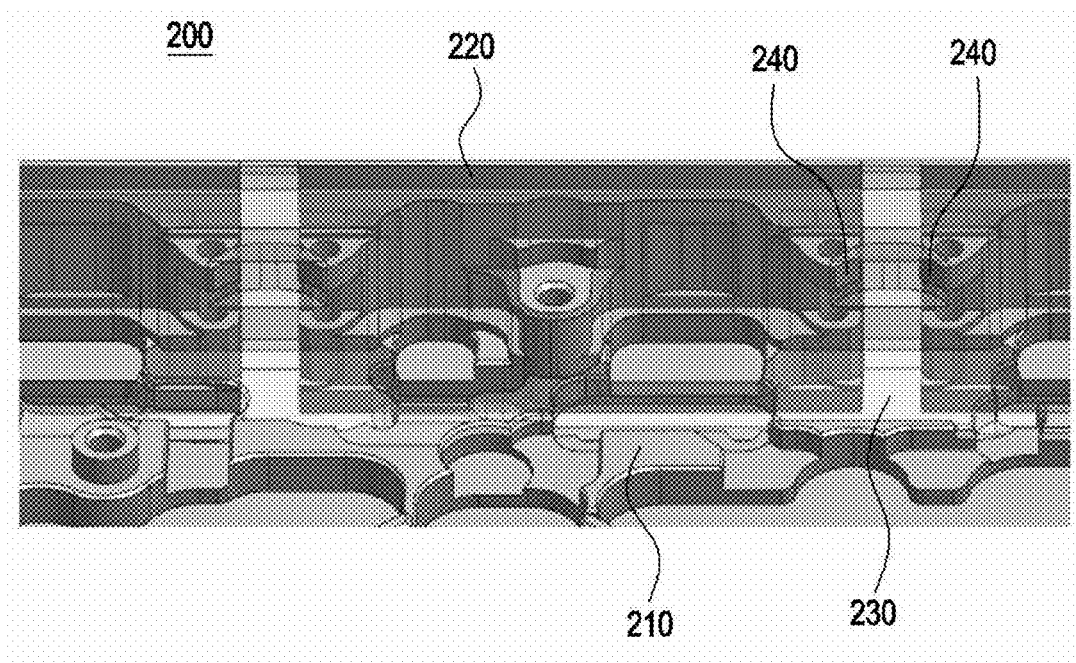
FIG. 6 is a projection view illustrating the interior of a housing according to an embodiment of the disclosure.

FIG. 6 is a projection view illustrating the interior of a housing according to an embodiment of the disclosure.

Figure 7:
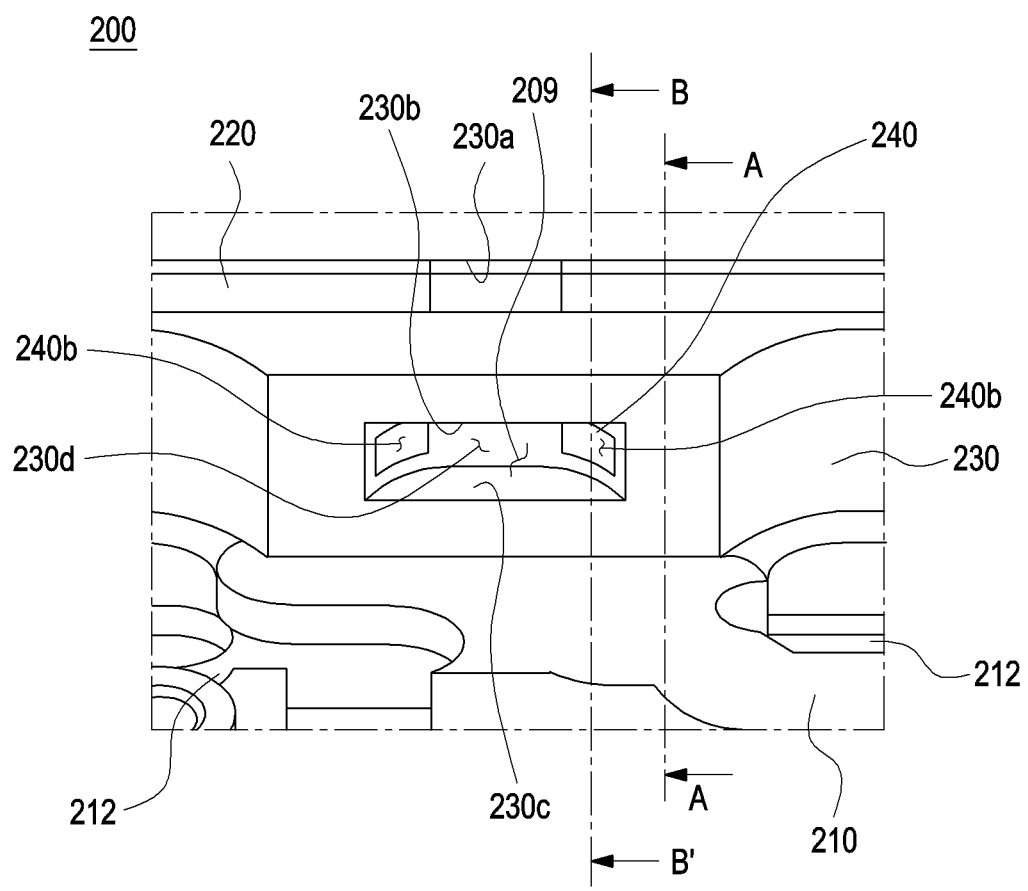
FIG. 7 is a perspective view illustrating an area A of FIG. 6 according to an embodiment of the disclosure.

FIG. 7 is a perspective view illustrating a housing according to an embodiment of the disclosure.

Figure 8A:
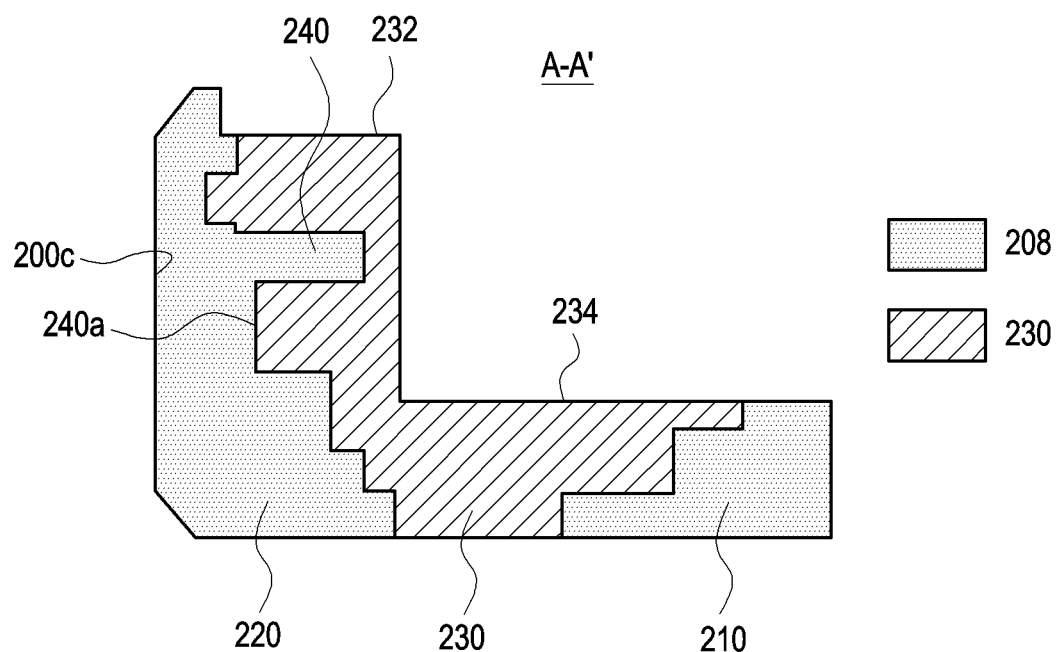
FIG. 8A is a cross-sectional view taken along a line A-A' of FIG. 7 according to an embodiment of the disclosure.
Figure 8B:
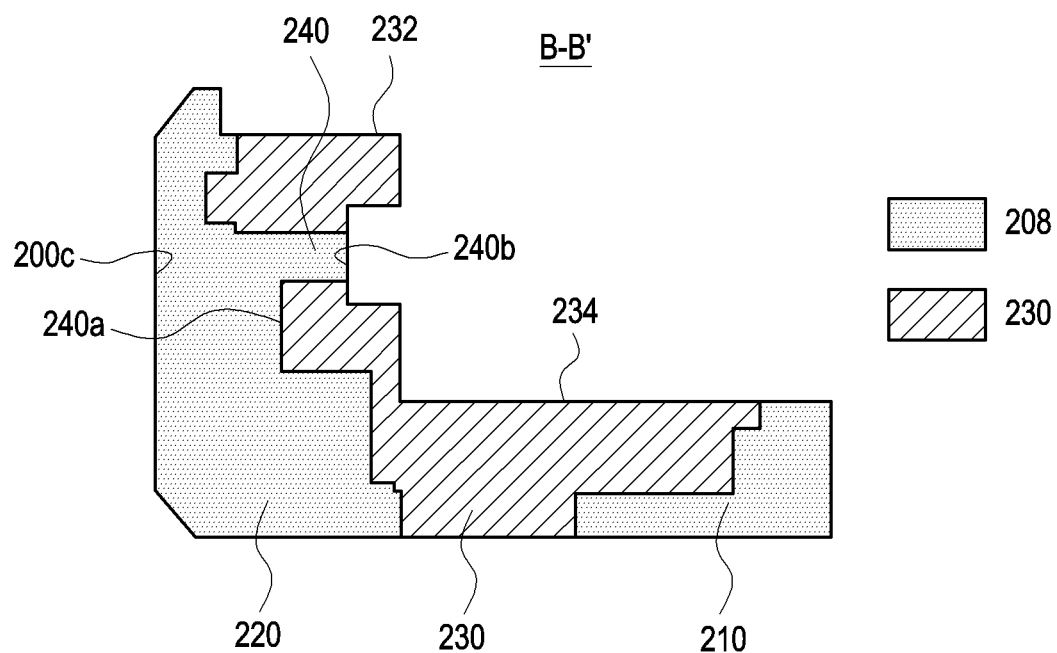
FIG. 8B is a cross-sectional view taken along a line B-B' of FIG. 7 according to an embodiment of the disclosure.

FIG. 8A is a cross-sectional view taken along a line A-A' of FIG. 7 according to an embodiment of the disclosure, and FIG. 8B is a cross-sectional view taken along a line B-B' of FIG. 7 according to an embodiment of the disclosure.

Referring to FIGS. 6, 7, 8A, and 8B, the second metal area 220 of the electronic device 101 may include the protrusion structure 240 to reduce or prevent bending of the electronic device 101 during and/or after a manufacturing process of the electronic device 101. The configurations of the electronic device 101, the first metal area 210, the second metal area 220, and the resin area 230 of FIGS. 6, 7, 8A, and 8B may be wholly or partially identical to those of the electronic device 101, the first metal area 210, the second metal area 220, and the resin area 230 of FIGS. 2, 3A, 3B, and 4.

The second metal area 220 may include at least one protrusion structure 240. The protrusion structure 240 may extend from the second metal area 220 toward the first metal area 210 or the inside of the electronic device 101. The protrusion structure 240 may extend from the second metal area 220 forming the side surface 200c of the electronic device 101 in a direction parallel to the front surface (e.g., the front surface 200a of FIG. 2) or the rear surface (e.g., the rear surface 200b of FIG. 2).

The protrusion structure 240 may increase bonding force between the resin area 230 and the second metal area 220. The resin area 230 may be coupled with at least part of the protrusion structure 240. For example, the protrusion structure 240 may include a first surface 240a facing the resin area 230. The first surface 240a may be disposed to face the first metal area 210.

Part of the protrusion structure 240 may be exposed into the electronic device 101. The protrusion structure 240 may include a second surface 240b facing the inside of the electronic device 101. As the second surface 240b is cut together with the resin area 230, the second surface 240b may not be covered by the resin area 230. The second surface 240b may face the opposite of the electronic device 101 or the side surface 200c of the housing 200. For example, the second surface 240b may face the first metal area 210.

The protrusion structure 240 may be integrally formed with the second metal area 220. The protrusion structure 240 may be formed by being cut from a first bridge structure (e.g., a first bridge structure 250 of FIG. 10A). For example, the protrusion structure 240 may be formed by cutting the first bridge structure 250 of the second metal area 220 using computer numerical control (CNC).

The protrusion structure 240 may include a boss hole 242. According to an embodiment, the boss hole 242 as a link hole may accommodate a component of the electronic device 101. According to an embodiment, the boss hole 242 may pass through the protrusion structure 240 in the thickness direction of the electronic device 101.

The resin area 230 may connect the first metal area 210 and the second metal area 220 to each other. According to an embodiment, the resin area 230 may include a first resin area 232 connected to the first metal area 210 and a second resin area 234 extending from the first resin area 232 and connected to the second metal area 220. According to an embodiment, the first resin area 232 may be an area extending from the second resin area 234 toward the side surface 200c of the electronic device 101.

The resin area 230 may function as a segmenter for an antenna. The resin area 230 may include a third surface 230a exposed to the outside of the electronic device 101. The third surface 230a may form at least part of the side surface 200c of the electronic device 101 and be disposed between at least one second metal area 220. For example, the third surface 230a may be located between a plurality of second metal areas (e.g., at least two of the $(2-1)^{th}$ metal area 222-1, the $(2-2)^{th}$ metal area 224-1, the $(2-3)^{th}$ metal area 226-1, or the $(2-4)^{th}$ metal areas 228-1). The first resin area 232 may include the third surface 230a. The second resin area 234 may form the rear surface (e.g., the rear surface 200b of FIG. 2) of the electronic device 101.

The housing 200 may include a recess 209 formed in the resin area 230 and the second metal area 220. The recess 209 may be a groove formed in the second metal area 220 and the resin area 230 using a T-cut cutting process. For example, the second metal area 220 and the resin area 230 may be cut together, and part (e.g., the second surface 220b) of the second metal area 220 may be exposed into the electronic device 101.

The resin area 230 may form at least part of the recess 209. For example, the resin area 230 may include a fourth surface 230b, a fifth surface 230c facing the fourth surface 230b, and a sixth surface 230d surrounding a part between the fourth surface 230b and the fifth surface 230c. The second surface 240b of the protrusion structure 240 may form substantially the same surface as the sixth surface 230d. For example, the second surface 240b and the sixth surface 230d may be formed through the same cutting process (e.g., a second cutting process 330 of FIG. 10D). For example, the second surface 240b and the sixth surface 230d may form surfaces having substantially the same curvature.

The housing 200 may include an anodizing layer 212 formed in the first metal area 210. The anodizing layer 212 may be a layer formed by oxidizing at least part of the first metal area 210. At least part of the anodizing layer 212 may face the resin area 230.

Figure 9:
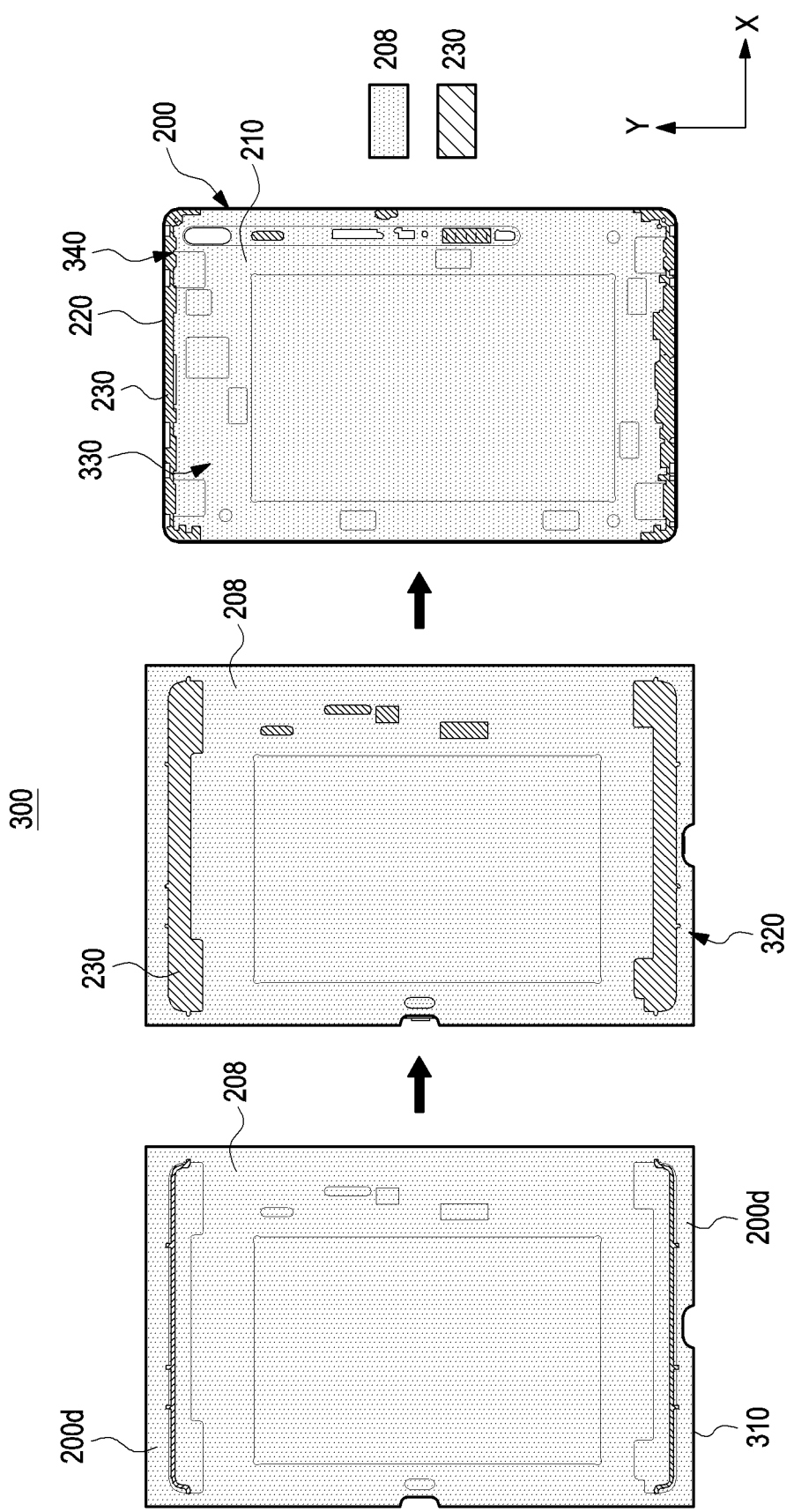
FIG. 9 is a diagram referred to for describing a method of manufacturing an electronic device according to an embodiment of the disclosure.

FIG. 9 is a diagram referred to for describing a process of manufacturing an electronic device according to an embodiment of the disclosure.

Figure 10A:
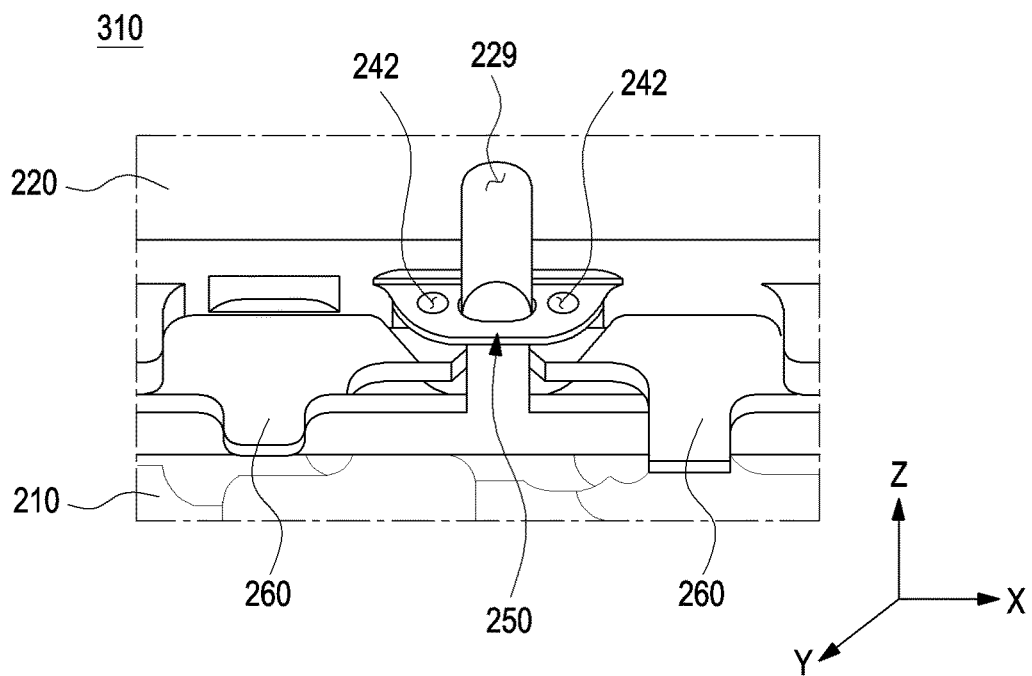
FIG. 10A is a diagram referred to for describing a first cutting process according to an embodiment of the disclosure.

FIG. 10A is a diagram referred to for describing a first cutting process according to an embodiment of the disclosure.

Figure 10B:
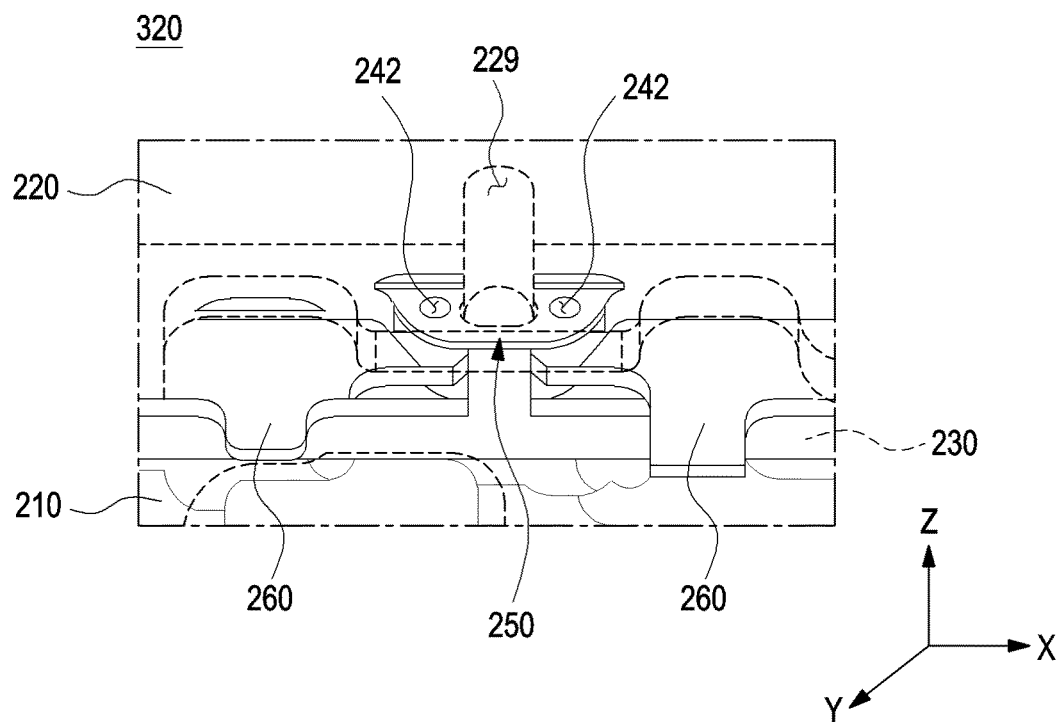
FIG. 10B is a diagram referred to for describing an injection process according to an embodiment of the disclosure.

FIG. 10B is a diagram referred to for describing an injection process according to an embodiment of the disclosure.

Figure 10C:
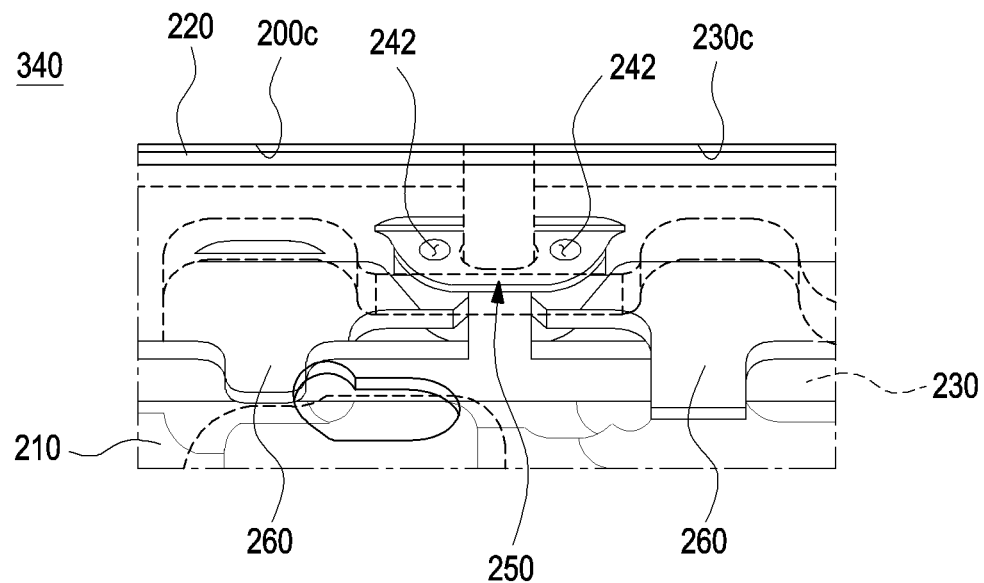
FIG. 10C is a diagram referred to for describing a third cutting process according to an embodiment of the disclosure.

FIG. 10C is a diagram referred to for describing a third cutting process according to an embodiment of the disclosure.

Figure 10D:
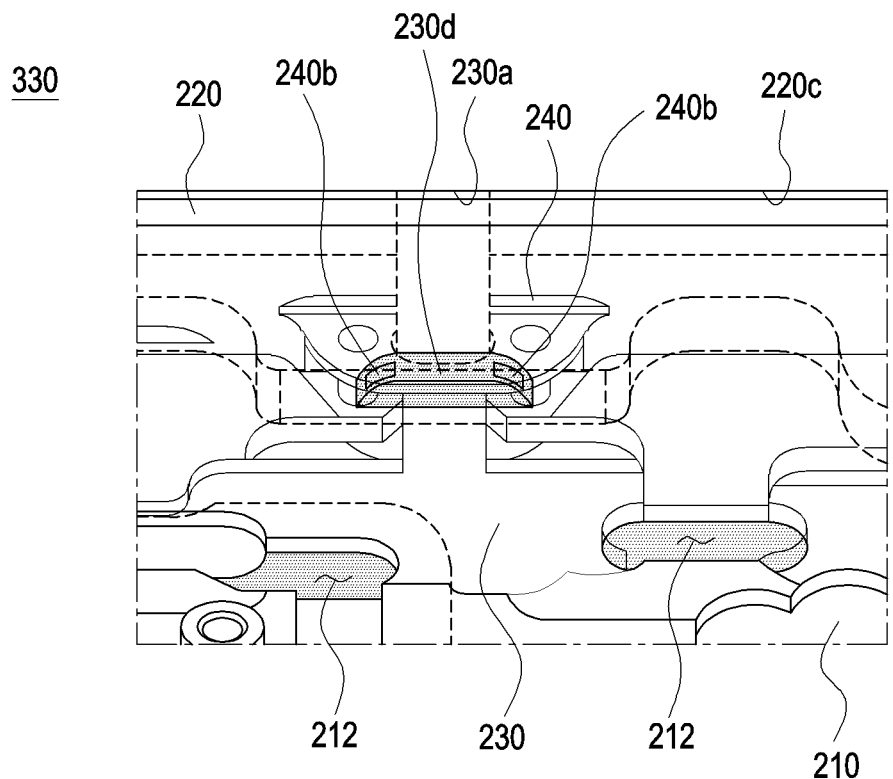
FIG. 10D is a diagram referred to for describing a second cutting process according to an embodiment of the disclosure.

FIG. 10D is a diagram referred to for describing a second cutting process according to an embodiment of the disclosure.

Figure 11:
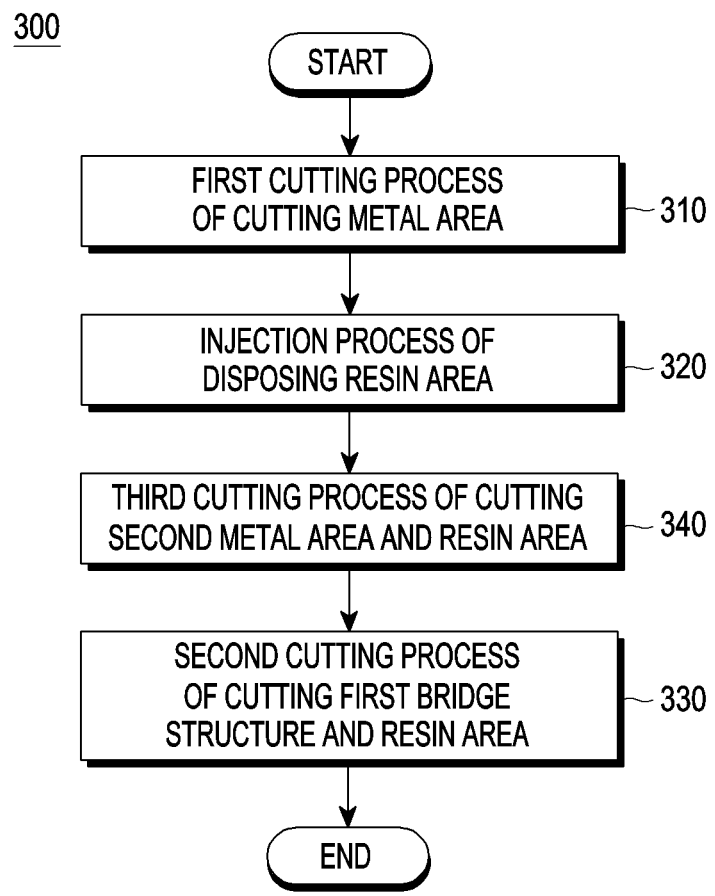
FIG. 11 is a flowchart illustrating a method of manufacturing an electronic device according to an embodiment of the disclosure.

FIG. 11 is a flowchart illustrating a method of manufacturing an electronic device according to an embodiment of the disclosure.

Referring to FIGS. 9, 10A, 10B, 10C, 10D, and 11, a method 300 of manufacturing an electronic device may include a first cutting process 310 of cutting the metal area 208, an injection process 320 of disposing the resin area 230, a third cutting process 340 of cutting the second metal area 220 and the resin area 230, and a second cutting process 330 of cutting the first bridge structure 250 and the resin area 230. The configurations of the electronic device 101, the metal area 208, the first metal area 210, the second metal area 220, the resin area 230, and the protrusion structure 240 of FIGS. 9, 10A, 10B, 10C, 10D, and 11 may be wholly or partially identical to those of the electronic device 101, the metal area 208, the first metal area 210, the second metal area 220, the resin area 230, and the protrusion structure 240 of FIG. 4, FIG. 6 and/or FIG. 7.

The method 300 of manufacturing an electronic device may include the first cutting process 310 of forming the first metal area 210 and a plurality of second metal areas 220 forming at least part of the edge 200d of the housing 200 by cutting the metal area 208 of the housing 200. The first cutting process 310 may be a process of cutting the metal area 208 before the resin area 230 is injected into the electronic device 101. The first cutting process 310 may be a process of cutting a metal material into a specified shape using at least one cutting machine, such as CNC, die cutting, or polishing. At least two components of the metal area 208 may be formed using the first cutting process 310. The first bridge structure 250 connected to the plurality of second metal areas 220 may be formed using the first cutting process 310. A second bridge structure 260 connected to the first metal area 210 and at least two of the plurality of second metal areas 220 may be formed using the first cutting process 310.

The first bridge structure 250 may connect the plurality of second metal areas 220 to each other during manufacturing of the electronic device 101. For example, the plurality of second metal areas 220 may be connected using the first bridge structure 250 until before the second cutting process 330, and bending of the electronic device 101 caused by external force applied during the process may be reduced or prevented.

The second bridge structure 260 may connect the first metal area 210 to at least two of the plurality of second metal areas 220 during manufacturing of the electronic device 101. For example, the first metal area 210 and the second metal area 220 may be connected using the second bridge structure 260 until before the third cutting process 340, and bending of the electronic device 101 caused by external force applied during the process may be reduced or prevented.

The first cutting process 310 may include a process of forming an accommodation groove 229 at least partially surrounded by the first bridge structure 250. The accommodation groove 229 may be a groove or recess formed in the second metal area 220. The accommodation groove 229 may accommodate the resin area 230. For example, the resin area 230 may be disposed within the accommodation groove 229.

The first cutting process 310 may include a process of forming the boss hole 242 in the first bridge structure 250.

The method 300 of manufacturing an electronic device may include the injection process 320 of forming the resin area 230 by disposing a resin material to be located between the first metal area 210 and the second metal area 220 and surround the first bridge structure 250. The injection process 320 may be a molding process in which the resin material is heated and injected into the metal area 208. For example, the injection process 320 may be a molding process in which the resin material (e.g., a synthetic resin) melted at a high temperature is injected into a metal component prepared in a mold to bond the resin material to the metal. The resin material may be a synthetic resin (e.g., plastic) or a natural resin, and may be an amorphous solid or semi-solid made of an organic compound or a derivative thereof.

The resin area 230 may be located in a space between the first metal area 210 and the second metal area 220 using the injection process 320. The resin area 230 may be formed to correspond to the shapes of the first metal area 210 and the second metal area 220. For example, the resin area 230 may be disposed within the accommodation groove 229 and surround at least parts of the first bridge structure 250 and the second bridge structure 260.

The method 300 of manufacturing an electronic device may include the third cutting process 340 of forming the third surface 230a of the resin area 230 exposed to the outside of the electronic device (e.g., the electronic device 101 of FIG. 2) by cutting the resin area 230 together with the second metal area 220. The third cutting process 340 may be a process of cutting the metal area 208 and/or the resin area 230 after the resin area 230 is injected into the electronic device 101. At least two of the components of the electronic device 101 may be formed using the third cutting process 340.

At least part of the side surface 200c of the electronic device 101 may be formed through the third cutting process 340. For example, the third cutting process 340 may form the side surface 200c of the electronic device 101 by cutting the edges of the second metal area 220 and the resin area 230. At least part (e.g., the third surface 230a) of the resin area 230 located in the accommodation groove 229 may be visually exposed to the outside of the housing 200 through the third cutting process 340.

The key input structures (e.g., the key input structures 202 of FIG. 2) may be formed through the third cutting process 340. For example, the third cutting process 340 may include a process of forming the key input structures 202 in the second metal area 220 by cutting the second metal area 220.

The method 300 of manufacturing an electronic device may include the second cutting process 330 of forming the protrusion structure 240 including the first surface 240a facing the resin area 230 and the second surface 240b exposed into the electronic device 101 by cutting the first bridge structure 250 and the resin area 230. The second cutting process 330 may be a process of cutting the metal area 208 and/or the resin area 230 after the resin area 230 is injected into the electronic device 101. According to an embodiment as illustrated in FIG. 11, the second cutting process 330 may be performed after the third cutting process 340. According to another embodiment (not shown), the second cutting process 330 may be performed before the third cutting process 340.

The protrusion structure 240 may be formed using the second cutting process 330. The first bridge structure 250 and the resin area 230 may be cut together, and the single first bridge structure 250 may be divided into two protrusion structures 240 in the second cutting process 330. The cut surface of the first bridge structure 250 may be the second surface 240b of the protrusion structure 240, and the cut surface of the resin area 230 may be the sixth surface 230d. A part located between two boss holes 242 of the first bridge structure 250 may be cut in the second cutting process 330.

The recess 209 may be formed using the second cutting process 330. For example, the recess 209 may be a groove or recess formed in the first bridge structure 250 of the second metal area 220 and the resin area 230 in the second cutting process 330.

The second cutting process 330 may be a T-cut or undercut process. For example, the second cutting process 330 may be a cutting process using a tool capable of cutting a material in a direction (e.g., a XY plane) substantially parallel to the display (e.g., the display 201 of FIG. 2) of the electronic device 101.

A cutting direction of the first cutting process 310 and the third cutting process 340 may be different from a cutting direction of the second cutting process 330. For example, the first cutting process 310 and the third cutting process 340 may be cutting processes using a tool capable of cutting a material in a direction (e.g., a Z-axis direction) substantially perpendicular to the display (e.g., the display 201 of FIG. 2) of the electronic device 101.

The second bridge structure 260 may be cut using the second cutting process 330. For example, the second cutting process 330 may include a process of cutting the second bridge structure 260 connecting the first metal area 210 and the second metal area 220 to each other. The method 300 of manufacturing an electronic device may further include a coating process of forming the anodizing layer 212 in the cut first metal area 210. For example, part of the first metal area 210 may be oxidized.

According to various embodiments of the disclosure, an electronic device (e.g., the electronic device 101 of FIG. 2) may include a housing (e.g., the housing 200 of FIG. 3A) including a metal area (e.g., the metal area 208 of FIG. 3A) and a resin area (e.g., the resin area 230 of FIG. 3A), a display (e.g., the display 201 of FIG. 2) disposed on the housing, and a battery (e.g., the battery 189 of FIG. 1) disposed within the housing. The metal area may include a first metal area (e.g., the first metal area 210 of FIG. 4) supporting the battery, and at least one second metal area (e.g., the second metal area 220 of FIG. 4) forming at least part of a side surface (e.g., the side surface 200c of FIG. 2) of the electronic device and including a protrusion structure (e.g., the protrusion structure 240 of FIG. 6) protruding toward the first metal area. The resin area may be disposed between the first metal area and the second metal area, and the protrusion structure may include a first surface (e.g., the first surface 240a of FIG. 8A) facing the resin area and a second surface (e.g., the second surface 240b of FIG. 8B) facing an inside of the electronic device.

The resin area may include a third surface (e.g., the third surface 230a of FIG. 7) located between the at least one second metal area and exposed to an outside of the electronic device.

The housing may include a recess (e.g., the recess 209 of FIG. 7) formed in the resin area and the second metal area.

The resin area may include a fourth surface (e.g., the fourth surface 230b of FIG. 7) forming at least part of the recess, a fifth surface (e.g., the fifth surface 230c of FIG. 7) facing the fourth surface, and a sixth surface (e.g., the sixth surface 230d of FIG. 7) surrounding a part between the fourth surface and the fifth surface.

The second surface may extend from the sixth surface and form substantially the same surface as the sixth surface.

The resin area may include a first resin area (e.g., the first resin area 232 of FIG. 8A) connected to the first metal area, and a second resin area (e.g., the second resin area of FIG. 8B) extending from the first resin area and connected to the second metal area.

The second metal area may include a (2-1)$^{th}$ metal area (e.g., the (2-1)$^{th}$ metal area 222-1 of FIG. 4), a (2-2)$^{th}$ metal area (e.g., the (2-2)$^{th}$ metal area 224-1 of FIG. 4), and a (2-3)$^{th}$ metal area (e.g., (2-3)$^{th}$ metal area 226-1 of FIG. 4) spaced apart from each other.

The electronic device may further include an antenna module (e.g., the antenna module 197 of FIG. 1) connected to the second metal area.

The housing may include an anodizing layer (e.g., the anodizing layer 212 of FIG. 7) formed in the first metal area and facing the resin area.

The protrusion structure may include a boss hole (e.g., the boss hole 242 of FIG. 6).

The first metal area and the second metal area may be spaced apart from each other.

The second metal area may include a front second metal area (e.g., the front second metal area 220-1 of FIG. 4) and a rear second metal area (e.g., the rear second metal area 220-2) spaced apart from the front second metal area, and the resin area may include a front resin area disposed between the front second metal area and the first metal area and a rear resin area disposed between the rear second metal area and the first metal area.

According to various embodiments of the disclosure, a method of manufacturing an electronic device (e.g., the method 300 of manufacturing an electronic device in FIG. 11) may include a first cutting process (e.g., the first cutting process 310 of FIG. 10A) of forming a first metal area (e.g., the first metal area 210 of FIG. 10A), a plurality of second metal areas (e.g., the second metal areas 220 of FIG. 10A) forming at least part of an edge of a housing (e.g., the housing 200 of FIG. 9), a first bridge structure (e.g., the first bridge structure 250 of FIG. 10A) connected to the plurality of second metal areas, and a second bridge structure (e.g., the second bridge structure 260 of FIG. 10A) connected to the first metal area and at least some of the plurality of second metal areas by cutting a metal area of the housing, an injection process (e.g., the injection process 320) of forming a resin area (e.g., the resin area 230 of FIG. 10B) by disposing a resin material to be located between the first metal area and the plurality of second metal areas and surround the first bridge structure, and a second cutting process (e.g., the second cutting process 330 of FIG. 10D) of forming a protrusion structure (e.g., the protrusion structure 240 of FIG. 10D) including a first surface (e.g., the first surface 240a of FIG. 8A) facing the resin area and a second surface (e.g., the second surface 240b of FIG. 10D) exposed into the electronic device by cutting the first bridge structure and the resin area.

The method may further include a third cutting process (e.g., the third cutting process 340 of FIG. 10C) of forming a third surface (e.g., the third surface 230a of FIG. 10C) of the resin area exposed to an outside of the electronic device by cutting the resin area together with the second metal area.

The second bridge structure may be cut, and the first metal area and the plurality of second metal areas may be spaced apart from each other, in the second cutting process.

An accommodation groove (e.g., the accommodation groove 229 of FIG. 10A) at least partially surrounded by the first bridge structure may be formed in at least some of the plurality of second metal areas to seat the resin area in the first cutting process.

A key input structure (e.g., the key input structures 202 of FIG. 2) may be formed in the second metal area by cutting the second metal area in the third cutting process.

A boss hole (e.g., the boss hole 242 of FIG. 10A) may be formed in the bridge structure in the first cutting process.

A recess may be formed in the resin area and the second metal area in the second cutting process.

The resin area may include a fourth surface (e.g., the fourth surface 230b of FIG. 7) forming at least part of the recess, a fifth surface (e.g., the fifth surface 230c of FIG. 7) facing the fourth surface, and a sixth surface (e.g., the sixth surface 230d of FIG. 7) surrounding a part between the fourth surface and the fifth surface, and the second surface may extend from the sixth surface and form substantially the same surface as the sixth surface.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing including a plurality of metal areas and an insulating area having an insulating material;
a display disposed on the housing; and
a battery disposed within the housing,
wherein the plurality of metal areas and the insulating area form at least part of a side surface of the electronic device,
wherein the insulating area is at least partially disposed between the plurality of metal areas and includes a recess formed in the insulating area, and
wherein at least a portion of the plurality of metal areas is exposed into an interior of the electronic device through the recess.

2. The electronic device of claim 1,
wherein the plurality of metal areas include a plurality of protrusion structures protruding toward the interior of the electronic device,
wherein each of the plurality of protrusion structures includes a first surface covered by the insulating area and a second surface exposed into the interior of the electronic device through the recess, and
wherein the insulating area includes a third surface located between the plurality of metal areas and exposed to an outside of the electronic device.

3. The electronic device of claim 2, wherein the insulating area comprises:
a fourth surface forming at least part of the recess;
a fifth surface facing the fourth surface; and
a sixth surface surrounding a part between the fourth surface and the fifth surface.

4. The electronic device of claim 3, wherein the second surface extends from the sixth surface and forms substantially a same surface as the sixth surface.

5. The electronic device of claim 1,
wherein the housing further includes another metal area supporting the display and the battery, and wherein the insulating area comprises:
a first insulating area connected to the another metal area; and
a second insulating area extending from the first insulating area and connected to the plurality of metal areas.

6. The electronic device of claim 1, wherein the plurality of metal areas are spaced apart from each other.

7. The electronic device of claim 1, further comprising:
an antenna module connected to the plurality of metal areas.

8. The electronic device of claim 5, wherein the housing comprises an anodizing layer formed in the another metal area and facing the insulating area.

9. The electronic device of claim 1,
wherein the plurality of metal areas include a plurality of protrusion structures protruding toward the interior of the electronic device,
wherein each of the plurality of protrusion structures includes a first surface covered by the insulating area and a second surface exposed into the interior of the electronic device through the recess, and
wherein each of the plurality of protrusion structures comprises a boss hole.

10. The electronic device of claim 5, wherein the another metal area and the plurality of metal areas are spaced apart from each other.

11. The electronic device of claim 5,
wherein the plurality of metal areas includes a front metal area and a rear metal area spaced apart from the front metal area, and
wherein the insulating area includes a front insulating area disposed between the front metal area and the another metal area, and a rear resin area disposed between the rear metal area and the another metal area.

12. The electronic device of claim 1,
wherein the plurality of metal areas include a plurality of protrusion structures protruding toward the interior of the electronic device, and
wherein each of the plurality of protrusion structures includes a first surface covered by the insulating area and a second surface exposed into the interior of the electronic device through the recess.

* * * * *